United States Patent [19]

Hammer

[11] Patent Number: 5,675,513
[45] Date of Patent: Oct. 7, 1997

[54] METHOD OF CALIBRATING AN INTERFEROMETER AND REDUCING ITS SYSTEMATIC NOISE

[75] Inventor: Philip D. Hammer, Mountain View, Calif.

[73] Assignee: The United States of America as represented by the Administrator of the National Aeronautics and Space Administration, Washington, D.C.

[21] Appl. No.: 605,348

[22] Filed: Feb. 16, 1996

[51] Int. Cl.$^6$ .................................................. G01B 9/02
[52] U.S. Cl. ....................... 364/525; 364/571.02; 364/575
[58] Field of Search .................................. 356/345, 349, 356/376; 250/252.1; 364/571.02, 525, 526, 560, 523, 577, 575

[56] References Cited

U.S. PATENT DOCUMENTS

| | | |
|---|---|---|
| 4,314,347 | 2/1982 | Stokely . |
| 4,768,881 | 9/1988 | Jüptner et al. ........................ 364/525 |
| 4,783,753 | 11/1988 | Crimmins . |
| 4,860,374 | 8/1989 | Murakami et al. ...................... 356/375 |
| 4,881,814 | 11/1989 | Hoult . |
| 4,976,542 | 12/1990 | Smith . |
| 5,110,207 | 5/1992 | Harris . |
| 5,110,211 | 5/1992 | Niki et al. . |
| 5,315,538 | 5/1994 | Borrell et al. . |
| 5,341,207 | 8/1994 | Tank et al. . |
| 5,546,084 | 8/1996 | Hindman ................................. 342/25 |

OTHER PUBLICATIONS

J.R. Kuhn et al "Gain Calibrating Nonuniform Image–Array Using Only The Image Data," published in Publ. Astron Soc. Pac., 103, 1097–1108 (1991).

W.H. Smith et al, "Digital Array Scanned Interferometers", published in the Exp. Astron. 1, 389–405 (1991).

M.L. Forman et al, "Correction of Asymmetrical Interferograms Obtained in Fourier Spectrology," published in the Opt. Soc. Am. 56, 59–63 (1966).

L. Mertz "Auxiliary Computation for Fourier Spectrometry," published in the Infrared Phys. 7, 17–23 (1967).

Primary Examiner—Emanuel T. Voeltz
Assistant Examiner—Craig Steven Miller
Attorney, Agent, or Firm—Kenneth L. Warsh; Harry Lupuloff; John G. Mannix

[57] ABSTRACT

Methods of operation and data analysis for an interferometer so as to eliminate the errors contributed by non-responsive or unstable pixels, interpixel gain variations that drift over time, and spurious noise that would otherwise degrade the operation of the interferometer are disclosed. The methods provide for either online or post-processing calibration. The methods apply prescribed reversible transformations that exploit the physical properties of interferograms obtained from said interferometer to derive a calibration reference signal for subsequent treatment of said interferograms for interpixel gain variations. A self-consistent approach for treating bad pixels is incorporated into the methods.

4 Claims, 8 Drawing Sheets

METHOD OF CALIBRATING AN INTERFEROMETER AND REDUCING ITS SYSTEMATIC NOISE

The invention described herein was made by an employee of the National Aeronautics and Space Administration and it may be manufactured and used by and for the United States Government for governmental purposes without the payment of royalties thereon or therefor.

BACKGROUND OF THE INVENTION

A. Technical Field of the Invention

The present invention relates to imaging spectrometers and, more particularly, to an imaging interferometer and a method of operation and data processing thereof that substantially reduces the effects of errors contributed by non-responsive or unstable pixels, interpixel gain variations that drift over time, and spurious noise of the detector of the interferometer all of which would otherwise degrade the accuracy of the measurements of the interferometer.

B. Description of the Prior Art

Imaging interferometers are accurate instruments that perform remote sensing of terrestrial scenes, land, ocean or atmosphere, from satellites, aircraft or from the surface. The imaging interferometers also have astronomical applications, and in addition to remote sensing, have the ability to make measurements for laboratory samples. One of the important components of the imaging interferometers is a detector array that needs periodic calibration in order to verify and maintain the accuracy of the measurements of the imaging interferometer.

The detector may be calibrated by the use of a conventional "flat-field" calibration procedure that involves a uniform intensity exposure at the surface of the detector at two or more different brightness levels that occur in succession. The measurements yielded by the "flat-field" calibration are used to derive pixel gain and offset matrices to be used to correct spatially variable signals obtained during field measurements. More particularly, the measurements of the "flat-field" calibration are used to conform the pixel gains and offset quantities to predetermined standards so that the signals of the pixels are correlatable to defined intensities. The term "flat-field" is generally referred to as that which supplies calibration signals that produce a flat response of the instrument being calibrated so that its performance maybe easily ascertained.

The calibration measurements should be made at about the same time as well as with the same detector operational conditions as experienced during the field measurements, in order to minimize the effects of the interpixel gain variations that drift over time and other systematic errors that are effected by operational conditions and elapsed time. It is advantageous to perform the "flat-field" calibration operation with the instrument optics assembled so that the spurious focal plane array (FPA) signals (i.e., variations caused by stray light and defects in the optics of the interferometer) that are proportional to the incident radiation falling on the detector may be treated as well. Under these conditions, a uniform signal present over the entire focal plane array may not be obtainable, even with a spatially uniform external target, because some structural patterns are always present for imaging spectrometers (spectra with dispersive instruments and interferograms for a digital array scanned interferometer (DASI)). The always present structural patterns would preclude attempts to obtain a uniform signal. The presence of such structural patterns together with the difficulties in performing frequent calibrations in the field so that accurate measurements of the interferometer may be assured reduce the effectiveness of the conventional "flat-field" calibration approach.

The restrictions and difficulties described above render the "flat-field" calibration ineffective under typically encountered conditions, such as the following scenarios: (1) the detector properties drift with time and it is not possible to obtain "flat-field" calibration information for the time that the observation or measurement is made by the interferometer; (2) a uniform pattern at the focal plane array is difficult to obtain because it more than likely requires dismantling of the interferometer so as to free the focal plane of the ever present structural pattern. The difficulty of obtaining a uniform pattern is particularly applicable to imaging interferometers for which incident radiation always results in the presence of the fringe patterns, known in the art, at the detector plane. Furthermore, different incident brightness levels may be accompanied by qualitatively different fringe patterns (caused by differences in the spectral distribution of the source) so that flat-fielding procedures that involve signal ratios are ineffective.

A method for calibrating an imaging interferometer that does not require a uniform pattern is described in a technical article of J. R. Kuhn, et al, entitled "Gain Calibrating Nonuniform Image-Array Data Using Only The Image Data," published in *Publ. Astron Soc. Pac.*, 103, 1097–1108, (1991), and herein incorporated by reference. The calibrating of Kuhn, et al has the advantage of permitting "flat-field" calibration using only the image data, that is, the data produced by the detector array of the interferometer of the non-uniform scene being observed, without additional data of uniform scenes. The method of Kuhn, et al may be very effective, providing that the images are identical, except for their displacement vector. Thus, the image needs to remain unchanged during the time interval over which the images are being acquired. Such conditions are common for astronomical applications, but not for earth observing applications where often a scene must be rapidly scanned, nor for any target that varies rapidly with time. Also, the method of Kuhn, et al requires that the sampling scale, along the shift vector of the detector array, is linear and that the shifts in the acquired data are an integral multiple of the sampling interval. These limitations reduce the desirability of the Kuhn, et al method of calibration. Thus, the prior art calibration method of Kuhn, et al, as well as the conventional "flat-field" calibration using the uniform signal over the focal plane array, suffers drawbacks and it remains a need in the prior art to provide a method of operating an interferometer that assures for the calibration of the interferometer so that its accuracy may be maintained.

Accordingly, it is a primary object of the present invention to provide a method of operating an imaging interferometer that does not require special calibration procedures, such as separate uniform intensity exposures, nor does it require the use of multiple identical image data.

It is a further object of the present invention to provide a method of operating an imaging interferometer that incorporates an on-line procedure for calibration, that is, a calibration method that is integrated into the operational sequence of the interferometer and does not need any special procedures that may periodically render the interferometer inoperative, such as by being disassembled.

It is yet another object of the present invention to provide a method of operating an interferometer that may be used retroactively to process data that have been previously acquired.

It is another object of the present invention to provide a method of operating an interferometer that may tolerate temporal instabilities of the detector array response such as interpixel gain variations that drift over time.

It is another object of the present invention to provide a method of operating an interferometer to minimize errors contributed to by non-responsive or unstable pixels of the detector array, interpixel gain variations that drift over time, and spurious noise within the detector array that might otherwise degrade the accuracy of measurement of the interferometer.

SUMMARY OF THE INVENTION

The present invention is directed to an interferometer and a method of operation and data processing thereof that reduce or even eliminate the effects of systematic errors such as those caused by variations and uncertainties in pixel responses.

The interferometer has means to process light from a light source so as to produce an interferogram, having a range of fringe path differences, on a focal plane and has means to image a field-of-view of the interferometer on a frame set basis onto a detector having pixels which provide signals to form an illumination pattern comprising the interferogram frames having m, n and l dimensions. The method comprises the steps of accepting, averaging, normalizing, detecting, interpolating, applying, and collecting. The method accepts a first interferogram frame set containing pixel information. Averaging is then performed on the pixel information of the interferograms over the l dimension thereof to yield a single, coadded interferogram frame having only m and n dimensions. Normalizing is then performed on the coadded interferogram frame to reduce signal variations along spatial coordinates thereof. The method then detects bad pixel information of the normalized coadded interferogram frame. Interpolating is then performed for the bad pixel information of the coadded interferogram frame. Applying phase alignment correction is then performed to the interpolated, coadded interferogram frame. Filtering is then performed on the phase alignment corrected interferogram frame to develop a systematic noise frame. The method then applies an inverse phase alignment correction to the systematic noise frame to develop a second order calibration frame. Acceptance again of the first interferogram frame set is then performed. Applying at least the second calibration frame to the again accepted first interferogram frame is then performed to correct for inter-pixel gain variation of systematic errors, frame-by-frame along the l dimension. Normalization of the inter-pixel gain variation corrected interferogram frames is then performed. Interpolating is then performed for the bad pixel information of the normalized inter-pixel gain variation corrected interferogram frames. Applying inverse normalization to the interpolated, inter-pixel gain variation corrected interferogram frames is then performed to form a second order corrected interferogram frame, which serves as the interferogram frame that is now free of spurious noise, as well as being free of the major contributions made by defective pixels. Collecting the corrected interferogram frames over the l dimension yields the final second order corrected interferogram frame set.

DETAILED DESCRIPTION OF THE PREFERRED EMBODIMENTS

Figure 1:
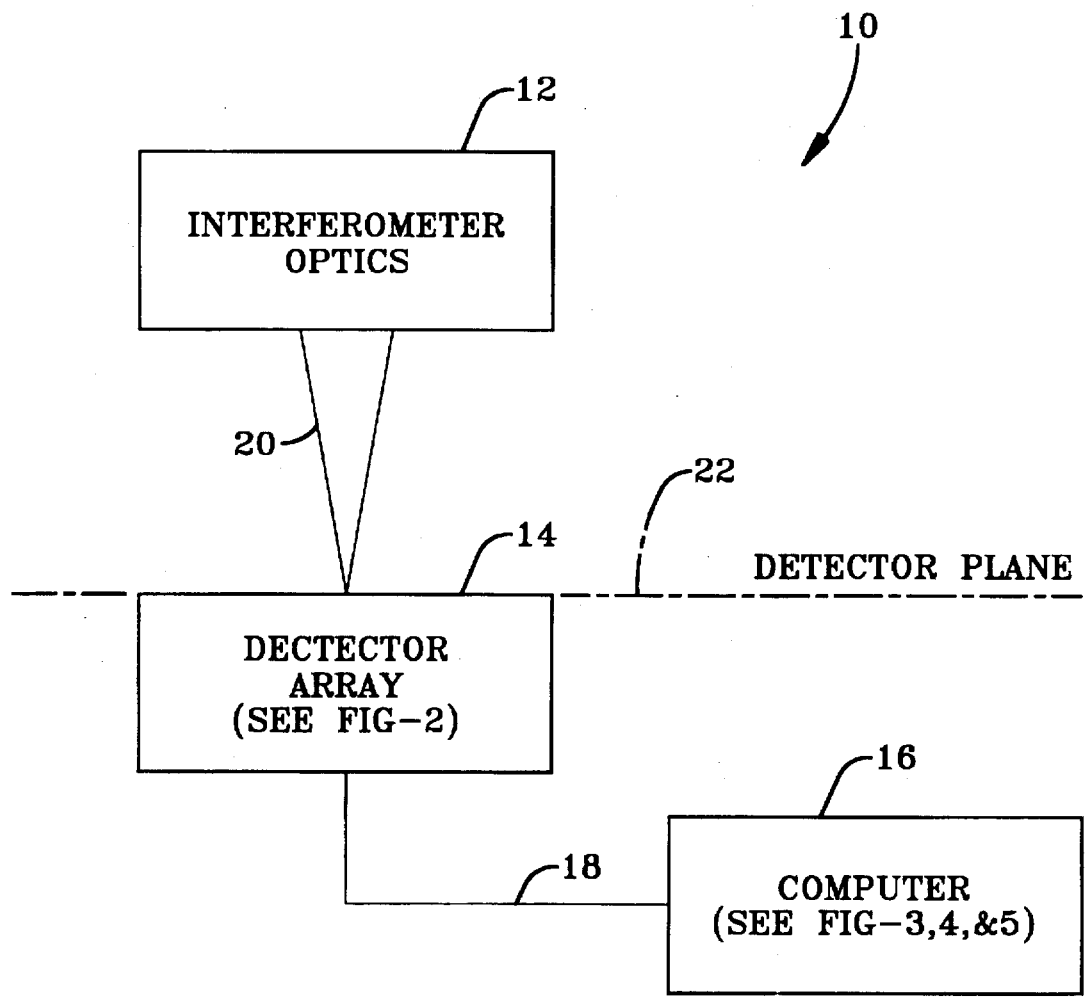
FIG. 1 is a block diagram of the imaging interferometer applicable to the present invention.

With reference to the drawing, wherein the same reference numbers indicate the same elements throughout, there is shown in FIG. 1 a block diagram of an imaging interferometer 10 applicable to the method and data analysis of the present invention. The interferometer 10 comprises interferometer optics 12 and a detector array 14 which delivers its developed signals to a computer 16, by way of a data communication bus 18.

The operation and description described herein of the interferometer 10 makes reference to terms, some of which are listed in Table 1 along with a general definition thereof.

TABLE 1

| TERM | GENERAL DEFINITION |
| --- | --- |
| Pixel | Smallest element on the detector array which serves as a particular (m, n) coordinate of the array, is fixed with respect to the detector array coordinate system, and applies for all frames over any given index (l). |
| Frame | Comprises an (m, n) array corresponding to single array exposure or an average of exposures of multiple arrays. |
| Coadd | A method by which pixel by pixel are averaged in place over a set of frames. |
| Three-Dimensional (3D) Data Set | A measurement of a scene or a uniform calibration sequence having dimensions: (m, n, l), wherein l is a sequential spatial dimension. |
| Fringe path difference scale variations | Differences that are caused by imperfections in the optics (both design and quality of materials). The resulting effect is a non-rectilinear path difference scale grid over the frame. For uniform scenes, fringe curvature and non-uniform fringe spacing and inclination over a frame are visually evident. |
| Zero path difference - (ZPD), also called zero phase shift. | ZPD is the origin of the fringe path difference scale. |
| Systematic noise | Noise that is caused by fixed-pattern errors over the (m, n) pixels of the detector array. |
| Random noise | Noise that has a randomly varying pattern over the (m, n) array from frame to frame (for each pixel). Coadding is effective in reducing this noise. |
| Spurious noise | Noise that is transient, occurring on isolated frames. An example is a marginal array pixel. |
| Time drift errors | Errors that occur over some finite |

TABLE 1-continued

| TERM | GENERAL DEFINITION |
| --- | --- |
|  | time interval. The most frequent errors of this type are: 1) drift of detector response properties over the course of sets of measurements (typically hours); and 2) change of detector characteristics between uses of the instrument (i.e., between detector cool-down cycles). |
| Pixel offset | This is a fixed pattern systematic effect that is inherent at zero-signal levels over the (m, n) pixels of the detector array, and can be measured by taking dark exposures (providing that thermal background radiation levels can be controlled). The presence of this effect is device dependent. |

The interferometer optics 12 produces a fringe pattern 20 of interfering light beams called an interferogram having a fringe path difference range, onto a detector plane 22 of the detector array 14. The interferometer optics 12 are known in the art and may be of the types described in U.S. Pat. No. 4,976,542 ('542), which is herein incorporated by reference.

As generally described in the '542 patent, the interferogram is measured for relative intensity and typically analyzed through Fourier transform techniques executed in a typical computer, such as computer 16, to determine the frequency components of the interferogram. In addition to typically Fourier analysis, the practice of the present invention includes an on-line calibration method that also removes unwanted components of the interferogram which is made up of digitized electrical signals that are derived by the detector array 14, which may be further described with reference to FIG. 2 which illustrates the nature and structure of the data sets obtained from the interferometer 10 of FIG. 1.

Figure 2A:
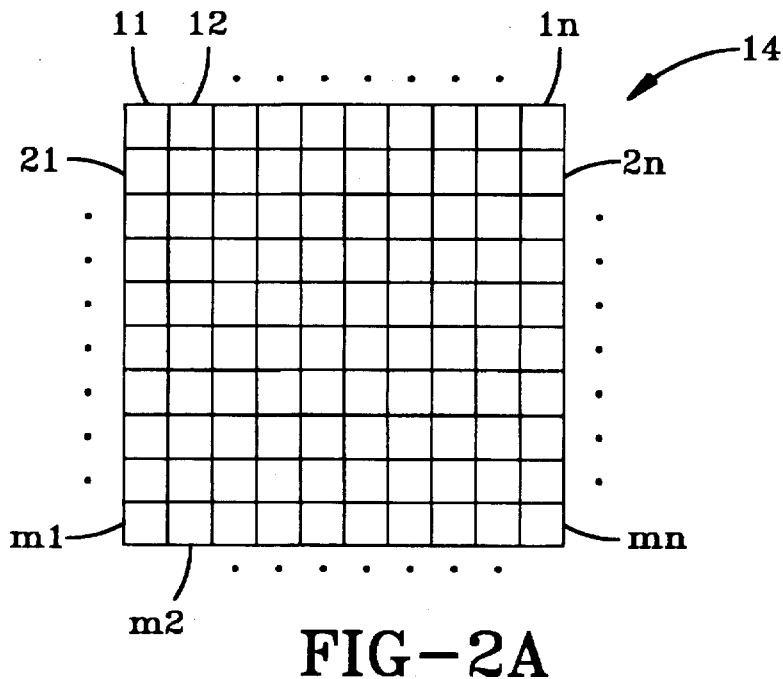
FIGS. 2(A) and 2(B) respectively illustrate: (1) the arrangement of the interferogram frames and the spatial coordinates of the illumination pattern (comprising frames) detected by the detector array of FIG. 1; and (2) the row-column-stacked matrix related to the present invention.
Figure 2B:
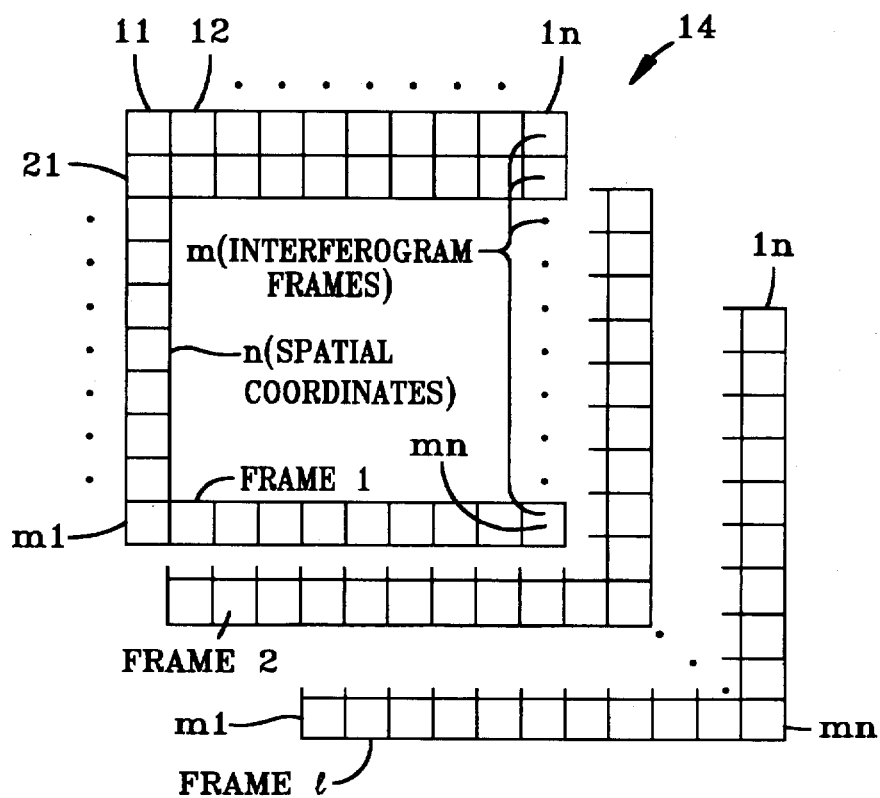

FIG. 2 is composed of FIGS. 2(A) and 2(B). The array 14 illustrated in FIG. 2(A) is arranged into (m,n) matrix. Each of the m rows of the matrix spans the interferogram coordinate (over columns 1 through n) corresponding to the path difference range between the two interfering beams of the interferometer optics 12. The path difference scale is in units of length (not shown in FIG. 2(A)) and has an origin (zero value) within each row that depends upon the optical configuration and adjustment of the interferometer 10. Each of the n columns spans the first spatial coordinate or dimension (over rows 1 through m) corresponding to a range of coverage of a scene in one dimension. The spatial scale is calibrated in units of length. Each element of the (m,n) matrix corresponds to a pixel of the detector array 14.

FIG. 2(B) illustrates the corresponding data set, sometimes referred to herein as a frame set, obtained from the array of FIG. 2(A). The set is three (3) dimensional with coordinates (m,n,l), sometimes referred to herein as dimensions. Each value of (l) has a corresponding frame (m,n) that is associated with the (m,n) coordinates (pixels) of the array of FIG. 2(A). The quantity, l, ranges over a sequence of frames and represents a time coordinate (time between frames) that often corresponds to a distance coordinate. The distance coordinate is the second spatial dimension of the scene with respect to the first spatial dimension n previously discussed with reference to FIG. 2(A).

Each of the elements of the row-column matrix of the detector array 14 preferably comprises a solid state or semiconductor device, such as a charged-couple device (CCD) which is referred herein as being a pixel. The operational performance of the CCD device serving as a pixel is further described in the '542 patent. Each of the pixels of the detector array 14 is electronically scanned in a manner known in the art. The detector array 14 is particularly suited for a digital array scanned interferometer (DASI) whose operation is further described in the technical article entitled, "Digital Array Scanned Interferometers," of W. H. Smith and W. V. Schempp, published in the *Exp. Astron.* 1, 389–405, (1991), and herein incorporated by reference.

The imaging interferometer 10 of FIG. 1 is herein referred to as a digital array scanned interferometer (DASI) 10 having a principle of operation based on interferometry and whose associated fringes are resolved spatially. The detector array 14 used in the (DASI) 10 may be arranged into a n×m (for example 256×256) array and provides spectral images (two dimensional spatial with a spectrum associated with each pixel). The digital array scanned interferometer (DASI) 10 is particularly suited for earth remote sensing that provides both spatial and spectral information about scenes or targets of interest and may be used to observe terrestrial scenes (land, ocean or atmosphere) from satellites, aircraft or surfaces, or may be used for astronomical applications or even for measurements of laboratory samples.

The digital array scanned interferometer (DASI) 10 of FIG. 1 operates with the internal optics of interferometer optics 12 fixed in position and the interferograms 20 are resolved spatially in one direction or coordinate at the detector plane 22 by the detector array 14. Spatial information is obtained in the orthogonal coordinate or dimension of the detector array 14 and two-dimensional spatial images are acquired by scanning over the field-of-view or scene of the interferometer 10, line-by-line. The resulting data set is commonly referred to as a frame set, with an interferogram frame comprising each line of the scene (corresponding to the 1 coordinate) which may be further described with reference to FIG. 2(B).

As seen in FIG. 2(B), and as previously mentioned, the interferogram frames are defined by the row-column array of (m,n) the detector 14, with the first spatial coordinate defined by the column (n) of the row column array of the detector array 14 and the second spatial coordinate by (l). Two-dimensional spatial images are defined by a sequence of frames and are acquired by scanning over the field-of-view, line-by-line, with each interferogram frame (m,n) having a spatial coordinate with points defined by each of the rows, m. Images, sometimes referred to herein as illumination patterns, made up collectively by the interferogram frames of the detector array 14, without the benefits of the present invention, are degraded by systematic errors of the digital array scanned interferometer (DASI) 10.

Systematic noise and errors occurring during the obtainment of image data can degrade the images produced by the imaging interferometer instruments, such as the digital array scanned interferometer (DASI) 10. The systematic noise and errors can severely limit the signal-to-noise parameter of the digital array scanned interferometer (DASI) 10. These errors can be caused by defects and systematic irregularities in the detector array 14 (i.e., non-responsive or unstable pixels and interpixel gain variations that drift over time). Further, as discussed in the "Background" section, the detector, such as the detector array 14, suffers from the generation of spurious noise which has no useful purpose and acts as a systematic error. All of these systematic errors not only degrade the overall performance of the digital array scanned interferometer (DASI) 10, but also cause distortions and artifacts in the measured spectra.

The present invention provides a method of operating and data processing for an imaging interferometer, such as the digital array scanned interferometer (DASI) 10 which minimize or even eliminate errors contributed to by non-responsive or unstable pixel, interpixel gain variations that drift over time and spurious noise that degrade the overall operation of the digital array scanned interferometer (DASI) 10. The present invention develops first and second calibration reference signals, with the first being optional but preferred and being predetermined and pre-established, whereas the second is derived from the imaging data that is compensated for by the removal of the effects of fringe path difference scale variations on the interferogram frame. Both the first and second calibration reference signals are used to eliminate the effects of interpixel gain variation from imaging data. Additional steps are made to minimize the effects of bad pixels and spurious noise.

Figure 3A:
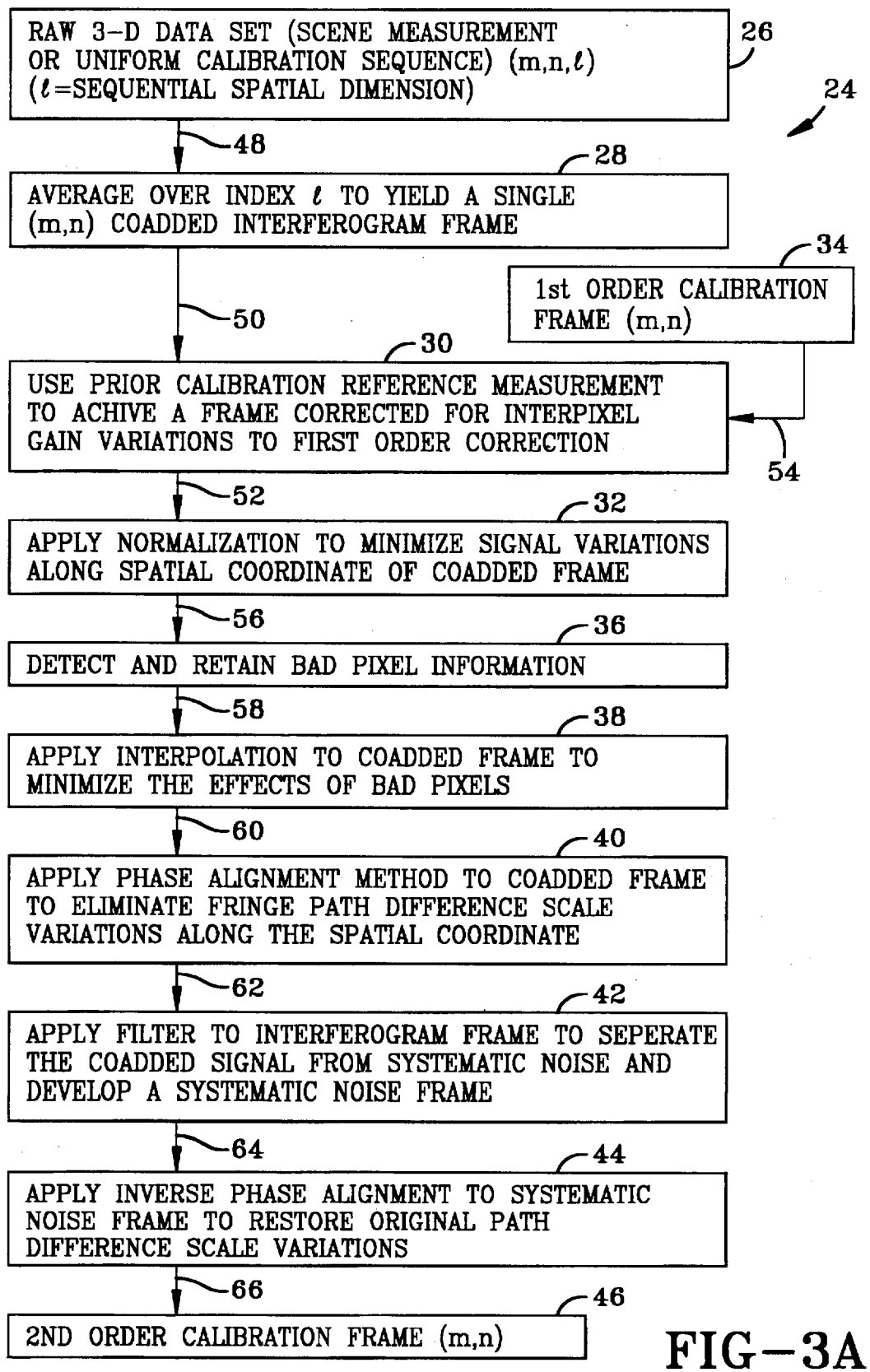
FIGS. 3(A) and 3(B) illustrate overviews of first and second stages of the overall method of operating and data analysis of one embodiment of the present invention.
Figure 3B:
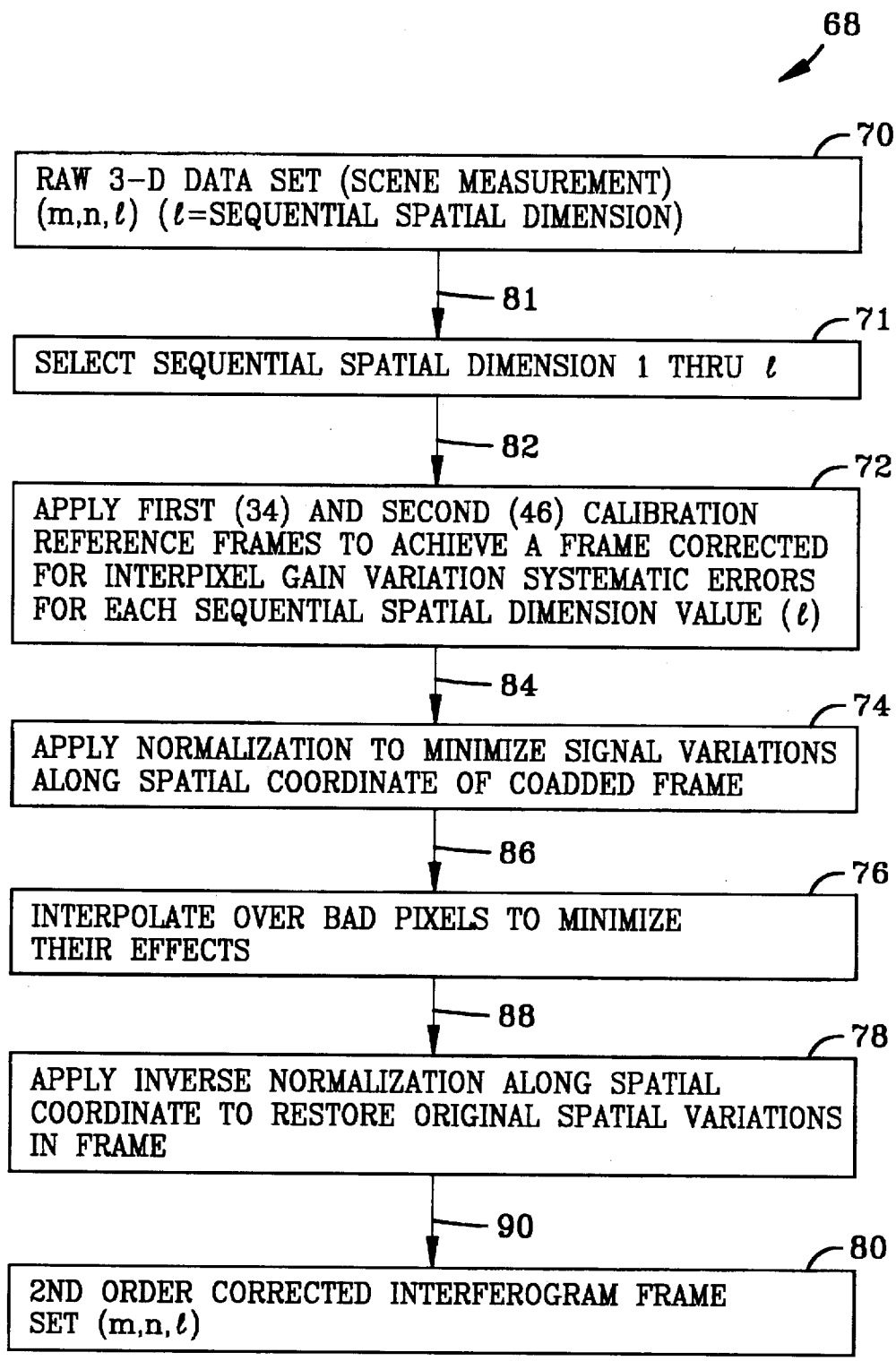

The method of the present invention of operating the interferometer 10 and the data processing thereof may be described with reference to FIGS. 3 and 4, each of which indicate process segments having data states each represented with a rectangular symbol and process, sequences or transformation each represented by a parallelogram symbol having sloped end walls and generally referred to herein as segments. FIG. 3 is composed of FIGS. 3(A) and 3(B) that respectively illustrate first and second stages of the overall method of operation and data analysis of the present invention, wherein the first stage (FIG. 3(A)) determines a second order calibration frame for subsequent use in the second stage FIG. 3(B)). FIG. 3(A) illustrates a sequence 24 of operating segments comprising a plurality of data states and/or process segments listed in Table 2.

TABLE 2

| REFERENCE NO. | DATA STATE/PROCESS SEGMENT |
| --- | --- |
| 26 | Raw 3-D data set (scene measurement or uniform calibration sequence). |
| 28 | Average over index 1 to yield a single (m, n) coadded interferogram frame. |
| 30 | Use prior calibration reference measurements to achieve a frame corrected for interpixel gain variations to first order. |
| 32 | Apply normalization to minimize signal variations along spatial coordinate of coadded frame. |
| 34 | First Order Calibration Frame |
| 36 | Detect and retain bad pixel information. |
| 38 | Apply interpolation to coadded frame to minimize the effects of bad pixels. |
| 40 | Apply phase alignment method to coadded frame to eliminate fringe path difference scale variations along the spatial coordinate. |
| 42 | Apply filter to interferogram frame to separate the coadded signal from systematic noise. |
| 44 | Apply inverse phase alignment to systematic noise frame to restore original path difference scale variations. |
| 46 | Second Order Calibration Frame |

Data state 26 is the initial segment of the first stage and inputs the raw three (3) dimensional data set thereto having the general format illustrated in FIG. 2(B).

The segment 28, as well as all of the processes, sequences, transformations or segments illustrated in FIG. 3, as well as FIG. 4, is executed by a program residing in a conventional computer, such as computer 16 of FIG. 1. Segment 28 performs a coadd operation to average the pixel information in the raw three dimensional (3-D) data over the index 1 to yield a single coadded interferogram frame, which is directed to segment 30 via signal path 50.

Segment 30 is optionally, but preferred and receives, via signal path 54, the output of program segment 34 which also is optional but preferred. The segment 30 is schematically and generally illustrates an error correction using a prior obtained calibration reference (i.e., segment 34), such as that obtained from a previously accomplished process of FIG. 3 or from an independent source, which is used as a signal for operating on the interferogram frame of segment 28 to achieve a first order adjustment for interpixel gain variations. Pixel offset adjustments, if required (dependent on the particular detector array) may be carried out within segment 30. The interferogram frame of segment 30, partially corrected for systematic noise is routed to segment 32 via signal path 52. The remaining steps of sequence 24 serve to determine remaining systematic errors, such as non-responsive pixels, unstable pixels, and unwanted residual inter-pixel gain variations that are indicative of the drifting condition of the response of pixel. The non-responsive condition may be indicated by the CCD device, serving as the pixel, supplying a signal that is below a predetermined limit established by the performance requirements of CCD device itself. The unstable pixel may be manifested by pixels supplying a varying type signal. The drifting interpixel gain variation may be evident by examining the pixel signals comprising the complete interferogram frame to determine if the signals thereof are within a predetermined band or by a similar manner using ratios of signals. The performance requirements of the pixel under analysis may vary in accordance with the manufacturer of the pixel device and are not considered part of the present invention, but rather the present invention only desires that a calibration reference be derived for the particular pixel finding application in the detector array 14 and that the calibration reference be used as a standard to be subsequently compared against and to perform adjustments on the pixel signals of the raw data comprising each interferogram frame of segment 26 or other data sets for which calibration is desired.

Segment 32 applies known normalizing techniques to minimize signal variations along spatial coordinate (rows 1 through m (see FIG. 2(A)) of coadded data. The normalization is a preprocess operation for treating bad pixels as will be described. The output of segment 32 is routed to segment 36 via signal path 56.

Segment 36 detects and retains bad pixel information from the coadded, first order corrected, normalized frame. The pixel information is compared against reference quantities so that the associated pixels can be classified as being good or bad. The non-retained pixel information of the coadded frame is routed to segment 38 via signal path 58.

Segment 38 provides known techniques for interpolating the bad pixels of the first interferogram frame. More particularly, the segment 38 interpolates to find a valid or at least reasonable value for the bad pixels that falls between values developed by good pixels, all associated with the coadded frame inputted to segment 38. The important effect is that the coadded frame is substantially free of erroneous data contributed to by erroneously operating pixels. The coadded frame of segment 38 is outputted to segment 40 via signal path 60.

Segment 40 compensates for the characteristic particularly manifested by imaging interferometers in which the interferometer optics 12 establishes fringe path difference scales at the detector plane 22 that vary along the spatial coordinate (along columns in FIG. 2(A)). Experience has shown that shifts in the zero path difference (ZPD) points of the scales are the dominant source of these scale variations. Such scale variations cause curvature and skewing of the fringe patterns of the interferogram data produced by the interferometer 10 of FIG. 1. Such fringe distortion is not generally harmful to the spectral analysis and interpretation of the data which is a row-by-row one-dimensional process in reference to FIG. 2(A), but is detrimental to the subsequent segments of the sequence 24 which entails two-dimensional transforms. It should be noted that the invariance of the transformed spectra with respect to imposed shifts and alignment of the phase results in high stability in spectral scale calibration with respect to mechanical alignment shifts of the optics. Various methods for eliminating the effects of the fringe path different scale variations along the spatial coordinates of the interferogram frame are known in the art, and one such method will be further described with reference to FIG. 4 illustrating, among other things, a row-wise phase process to be described hereinafter. It now suffices to say that segment 40 produces an output signal that is adapted to have the effects of the fringe path scale variations removed, and is directed onto signal path 62 which is routed to segment 42.

Segment 42 employs known filtering techniques for filtering the input interferogram frame so as to separate the coadded signal from systematic noise and, thus, develop a systematic noise frame, which is routed to segment 44 via signal path 64.

Segment 44 is substantially a process which is the inverse of that of segment 40. More particularly, segment 44 can be a reversible transformation of a two-dimension Fourier domain quantity of segment 40. The use of reversible transformation is of importance of the present invention and is used in the various embodiments of the present invention. Specifically, segment 44 applies an inverse phase alignment to its received systematic noise frame to restore original path difference scale variation characteristic of the frames prior to segment 40. Effectively, segment 44 restores noise consistent with the original data set of segment 26. Segment 44 provides an output on its signal path 66 as the data state 46 which is the second order calibration frame and which is used in the second stage illustrated in FIG. 3(B) having an overall sequence 68 comprised of data states and process segments listed in Table 3. The first sequence or stage 24 must be completed before beginning the second sequence or stage 68.

TABLE 3

| REFERENCE NO. | DATA STATE/PROCESS SEGMENT |
| --- | --- |
| 70 | Raw 3-D data set (scene measurement) (m, n, l) (l = sequential spatial dimension). |
| 71 | Select sequential spatial dimension 1 through l |
| 72 | Apply first (34) and second (46) calibration reference frames to achieve a frame corrected for inter-pixel gain variation systematic errors for each sequential spatial dimension value (l). |
| 74 | Apply normalization to minimize signal variations along spatial coordinate of coadded frame. |
| 76 | Interpolate over bad pixels to minimize their effects. |
| 78 | Apply inverse normalization along spatial coordinate to restore original spatial variations in frame. |
| 80 | 2nd order corrected interferogram frame set (m, n, l). |

Data state 70 is the initial segment of the second stage and is the same or similar to data state 26 of the first stage of FIG. 3(A) previously discussed and is reapplied to the second stage. Specifically, data state 70 may represent the identical frame set as data state 26, or may represent a different frame set obtained at about the same time assuming that time dependent systematic noise of the detector has not changed significantly. The raw three-dimensional (3-D) data set of segment 70 is routed to segment 71 via signal path 81.

Segment 71 selects frames (m,n) in sequence from 1 through l of the sequential spatial dimension to be processed in sequence by the subsequent segments of sequence 68.

Segment 72 primarily corrects for inter-pixel gain variation previously mentioned for preferred segment 30 of FIG. 3(A) and operates in a similar manner thereto; however, segment 72 applies first (if applied in sequence 24) (see segment 34 of FIG. 3(A)) and second (see segment 46 of FIG. 3(A)) calibration reference frames to achieve a frame corrected for inter-pixel gain variation systematic errors for each sequential spatial dimension value 1 (see FIG. 2(B)). Pixel offset adjustments, if required (dependent on the particular detector array) are carried out within segment 72. The processed frame of segment 72 corrected for inter-pixel gain variation systematic errors is routed to segment 74, via signal path 84.

Segment 74 performs the same operation and data analysis as the previously described segment 32 of FIG. 3(A). Segment 74, like segment 32, serves as a preprocess step for treating bad pixels and supplies a normalized output representation thereof to segment 76, via signal path 86.

Segment 76 receives the normalized data and interpolates over bad pixel to minimize their unwanted effects in a manner similar to that of segment 38 of FIG. 3(A), and supplies a representative output thereof which is routed to segment 78, via signal path 88.

Segment 78 is substantially the inverse of segment 74. Specifically, segment 78 applies an inverse normalization of its received data along spatial coordinates of the received data to restore original spatial variations (raw data-segment 70) in the frame being processed in segment 78. Segment 78 provides an output on signal path 90 which is the second (2nd) order corrected interferogram frame (m,n) and is collected sequentially as data state 80. Upon completion of the sequence of segment 71 and successive segments, the result is a 2nd order corrected interferogram frame set (m,n,l) having a 3-D structure as data state 70. State 80 may be regarded as a collector for the sequential actions of segment 71.

The data in data state 80 is substantially free of the degrading effects of the systematic errors that have plagued prior art digital scanned array interferometers (DASIs).

It should now be appreciated that the practice of the present invention provides for a method of operating an imaging interferometer that not only eliminates unwanted systematic errors inherent in pixels formed from semiconductor devices such as CCD devices, but also eliminates or substantially reduces spurious noise that is created by undesired incident radiation that undesirably falls onto the detector array 14 or that is generated internally by such array, providing that such noise does not change significantly over the time scale for which the method is applied.

Figure 4A:
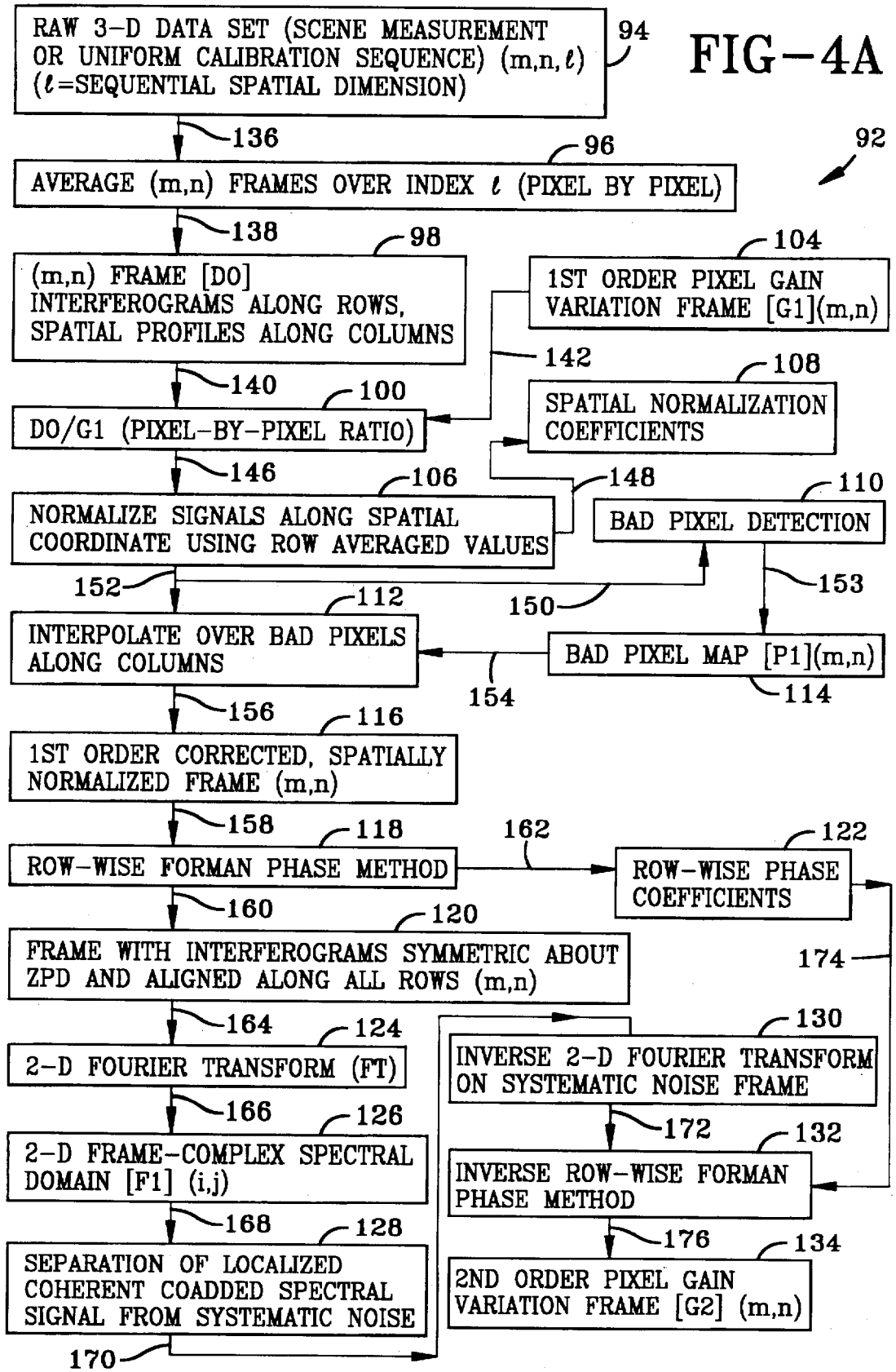
FIGS. 4(A) and 4(B) illustrate a specific embodiment of the present invention having features corresponding to those of the first and second stages of FIGS. 3(A) and 3(B).

The present invention further provides additional and more specific embodiments of methods for operating and data processing analyses of the imaging interferometer 10 of FIG. 1, and which may be further described with reference to FIG. 4 composed of FIGS. 4(A) and 4(B) that respectively illustrate first and second stages of a more specific method of operation and data analysis, wherein, like that of FIG. 3, the first stage (FIG. 4(A)) determines a second gain variation frame, G2, for subsequent use in the second stage (FIG. 4(B)). FIG. 4(A) illustrates a sequence 92 of operating segments comprising a plurality of data states and/or process segments listed in Table 4.

TABLE 4

| REFERENCE NO. | DATA STATES/PROCESS SEGMENTS |
| --- | --- |
| 94 | Raw 3-D data set (scene measurement or uniform calibration sequence) (m, n, l) (l = sequential spatial dimension). |
| 96 | Average (m, n) frames over index l (pixel-by-pixel). |
| 98 | (m, n) frame [DO] interferograms along rows, spatial profile along columns. |
| 100 | DO/G1 (pixel-by-pixel ratio) |
| 104 | First order pixel gain variation frame [G1] (m, n). |
| 106 | Normalize signals along spatial coordinate using row averaged values. |
| 108 | Spatial normalization coefficients. |
| 110 | Bad pixel detection. |
| 112 | Interpolate over bad pixels along columns. |
| 114 | Bad pixel map [P1] (m,n,). |
| 116 | First order corrected, spatially normalized frame (m, n). |
| 118 | Row-wise Forman phase method. |

| REFERENCE NO. | SEGMENT/NOMENCLATURE |
| --- | --- |
| 120 | Frame with interferograms symmetric about ZPD and aligned along all rows (m, n). |
| 122 | Row-wise phase coefficients. |
| 124 | 2-D Fourier Transform (FT). |
| 126 | 2-D frame – complex spectral domain [F1] (i, j). |
| 128 | Separation of localized coherent coadded spectral signal from systematic noise. |
| 130 | Inverse 2-D Fourier Transform on systematic noise frame. |
| 132 | Inverse Row-wise Forman phase method. |
| 134 | Second order pixel gain variation frame [G2] (m, n). |

The operational sequence of the method 92 of FIG. 4(A) has features similar to that of the operational sequence of the method of FIG. 3(A) in that both sequences receive raw data that may be contaminated with improper or erroneous pixel information, as well as being plagued by spurious noise, and both methods 24 and 92, in part, free the raw data of such degrading errors. The method 92 utilizes a raw three-dimensional (3-D) data set of segment 94, which is similar to the raw three-dimensional (3-D) data set of segment 26 of method 24. The method 92 can be considered a specific but not unique implementation of method 24. The method 92 of FIG. 4(A), and also the processing segments of FIG. 4(B), illustrates various signals indicated by terms having a general definition both of which are given on Table 5.

TABLE 5

| TERM | DEFINITION |
| --- | --- |
| DO | Input Frame (m, n). |
| G1 | First order pixel gain variation frame (m, n). |
| G2 | Second order pixel gain variation frame (m, n). |
| F1 | Two-dimensional frame – complex spectral domain (i, j). |
| P1 | Bad pixel map (first stage) (m, n). |
| P2 | Bad pixel map (second stage) (m, n). |

Segment 96 receives the raw three-dimensional (3-D) data set of segment 94 on signal path 136 and averages (m,n) frames over index l (see FIG. 2(B) for m,n and l quantities) on a pixel-by-pixel basis to develop input frame [DO] which serves as data state that is present on signal path 138. The input frame, DO, is typically data coadded from many single exposure frames from a measurement series. However, if desired but not preferred, the input frame, DO, can be an individual raw data frame to be corrected by the remaining processes of FIGS. 4(A) and 4(B). Furthermore, it should be noted that individual raw data may be entered into the method 24 and the remaining processes of FIGS. 3(A) and 3(B) will correct for the raw data in a manner as hereinbefore described with reference to FIG. 3.

Data state 98 comprises the input frame, DO, which represents interferograms along rows (see FIG. 2(A)) and a spatial profile along columns (see FIG. 2(A)). The input frame, DO, is applied to segment 100 via signal path 140. Segment 100 is optional but preferred. Segment 100 also receives, via signal path 142, the quantity, G1, which is provided by segment 104 as input.

Segments 104 and 100, in the preferred embodiment, use a prior calibration reference result (such as that obtained from a prior process of FIG. 4) to achieve a frame corrected for systematic interpixel gain variations to first order, in a manner similar to that of segments 34 and 30 of FIG. 3(A). Segment 104 serves as the first (1st) order pixel gain variation frame [G1] (m,n) that is routed to segment 100 which, in turn, perform the pixel-by-pixel division (DO/G1) of the quantities DO and G1 and supply a representative quantity thereof on signal path 146 which is routed to segment 106.

Segment 106 normalizes its received quantities or signals along spatial coordinates in a manner similar to that of segment 32 of FIG. 3(A), but specifically uses row averaged values. Segment 106, like segment 32, is a preprocess for detecting bad pixels. Segment 106 preferably gathers the spatial normalization coefficients and places such on signal path 148 which serve as data state 108 (spatial normalization coefficients). Segment 106 routes, via signal path 150, its normalized signal to segment 110 and also to segment 112, via signal path 152.

Segment 110 detects and retains bad pixel information in a manner similar to segment 36 of FIG. 3(A). Segment 110, via its operational program, passes its bad pixel information via signal path 153 to segment 114 which derives, in a manner known in the art, a bad pixel map [P1] (m,n), and which information is routed to segment 112 via signal path 154.

Segment 112 interpolates over bad pixels along columns in a manner similar to segment 38 of FIG. 3(A), and places its representative information on signal path 156. The information on signal path 156 represents data state 116 which is the first (1st) order corrected spatially normalized frame (m,n) which is routed to segment 118, via signal path 158.

Segment 118, in cooperation with segments 122, 124, 128, 130 and 132, all of FIG. 4(A), provides a method of eliminating the effects of the fringe path difference scale variations of the interferometer, as previously discussed with reference to segment 40 of FIG. 3(A). In general, the segments 118, 122, 124, 128, 130 and 132 form a reversible phase alignment correction process which eliminates the effects of variation in fringe path difference scales over the rows of the plane of the detector array 14 generally illustrated in FIG. 2 so that separation of systematic noise can be accomplished. It should be noted that the invariance of the transformed spectra with respect to imposed shifts and alignment of the phase results in high stability in spectral scale calibration with respect to mechanical alignment shifts of the optics. The resulting signal in Fourier space yielded by segment 120 represents the spectrum of the row-wise coherently coadded interferograms of the frame, and is highly localized. This signal is also optimally isolated from the noise and systematic error effects. Filtering out the signal accomplished by segment 128, retaining the noise and systematic effects, and applying the inverse composite transformation, as accomplished by segments 130 and 132, yields a pixel gain variation frame, G2. The rationale behind segments 118, 122, 124, 128, 130 and 132, and also the analogous segments of FIG. 3, is to invoke a prescribed series of reversible transformations on the array pixel space to a two-dimensional representation in terms of a suitable mathematical basis set in which filtering may be achieved and finally to invoke the composite inverse transforms to restore the original coordinate representation (m,n) described with reference to FIG. 2(B). The basis set representation used for FIG. 4(A) is the Fourier domain, F1, (segment 126) of the array pixel space. The row-wise phase alignment process executed by segment 118 is similar to the algorithms disclosed in the technical articles entitled "Correction of Asymmetric Interferograms Obtained in Fourier Spectroscopy," of M. L. Forman, et al, published in the *Opt. Soc. Am.* 56, 59–63, (1966) and "Auxiliary Computation for Fourier Spectrometry," of L. Mertz, published in the *Infrared Phys.* 7, 17–23, (1967), both of which technical articles are herein incorporated by reference.

Segment 118 of FIG. 4(A), operating in compliance with the row-wise Forman phase method, provides an interferometer frame with data of the interferogram being symmetrical about the position of zero phase difference (ZPD) of the interferogram coordinate and with this ZPD position being aligned along all rows of the frame (m,n). The arrangement of data about the zero phase difference (ZPD) is known in the art and need not be further described herein but further details thereof may be found in the technical articles of M. L. Forman, et al and L. Mertz. The alignment of the ZPD position over a frame is a method specific to two-dimensional data of the method of 92 and is accomplished by coordinating the row-wise Forman phase method between rows, which is general results in a set of row-wise phase coefficients, 122, that generally vary from row to row. The arranged data of segment 118 is placed on signal path 160 and serves as data state 120 (frame with interferograms symmetric about ZPD and aligned along all rows of the frame (m,n). Further, the segment 118, in a manner known in the art, provides the row-wise phase coefficients serving as data state 122, via signal path 162.

Data state 120 provides the interferogram frames with symmetry about the ZPD and aligned along all rows of the frame (m,n) to segment 124 by way of signal path 164. Segment 124 performs a two-dimensional (2-D) Fourier transform on the received data so that the received data is transformed from real signals to its complex elementary components. The transformed 2-D Fourier information, serving as a data state 126 of the complex spectral domain [F1] (i,j) is routed to segment 128 by way of signal path 168. The coordinates (i,j) are the transformed coordinates in the Fourier domain corresponding to the coordinates (m,n) described with reference to FIG. 2(B).

Segment 128, in a manner known in the art, and in a manner similar to segment 42 of FIG. 3(A), filters or selects out the localized coherent coadded spectra signal from systematic noise. The data of segment 128 is routed to segment 130 by way of signal path 170.

Segment 130 performs the inverse two-dimensional (2-D) Fourier transform corresponding to segment 124 on the systematic noise and routes the results thereof to segment 132 via signal path 172. If desired, the 2-D Fourier transform of segment 124 and the inverse composite 2-D Fourier transform segment 130 may be replaced respectively by a Hartley transform and a Hartley inverse transform, both known in the art, or more generally by other frequency domain transforms having suitable mathematical basis sets, also known in the art.

Segment 132 receives the row-wise phase coefficients of data state 122 via signal path 174 and combines such with the output of segment 130. Segment 132 then performs, in a manner known in the art, the inverse row-wise Forman phase process corresponding to segment 118 to form the second order pixel gain variation frame, G2, that is present on signal path 176 and serves a data state 134 and which is used in the second stage illustrated in FIG. 4(B) as a sequence 178 comprising a plurality of data states and/or process segments listed in Table 6.

TABLE 6

| REFERENCE NO. | DATA STATES/PROCESS SEGMENTS |
|---|---|
| 180 | Raw 3-D data set (scene measurement or uniform calibration sequence) (m, n, l) (l = sequential spatial dimension). |
| 182 | Sequence over index l. |
| 184 | Single frame [DO], (m, n). Interferograms along rows, spatial profiles along columns. |
| 186 | DO/(G1 × G2) (pixel-by-pixel ratio). |
| 188 | 1st and 2nd order pixel gain variation frames [G1], [G2] from stage 1 (m, n). |
| 190 | Normalize signals along spatial coordinate using row averaged values. |
| 192 | Spatial normalization coefficients. |
| 194 | Interpolate over bad pixels along columns. |
| 196 | Secondary bad/transient pixel detection. |
| 198 | Bad pixel map (second stage) [P2] (m, n). |
| 200 | Bad pixel map (first stage) [P1] (m, n). |
| 202 | 2nd order corrected, spatially normalized frame (m, n). |
| 204 | Inverse spatial normalization along spatial coordinate. |
| 205 | Collect over index l. |
| 206 | 2nd order corrected DASI interferogram frame (m, n). |

Figure 4B:
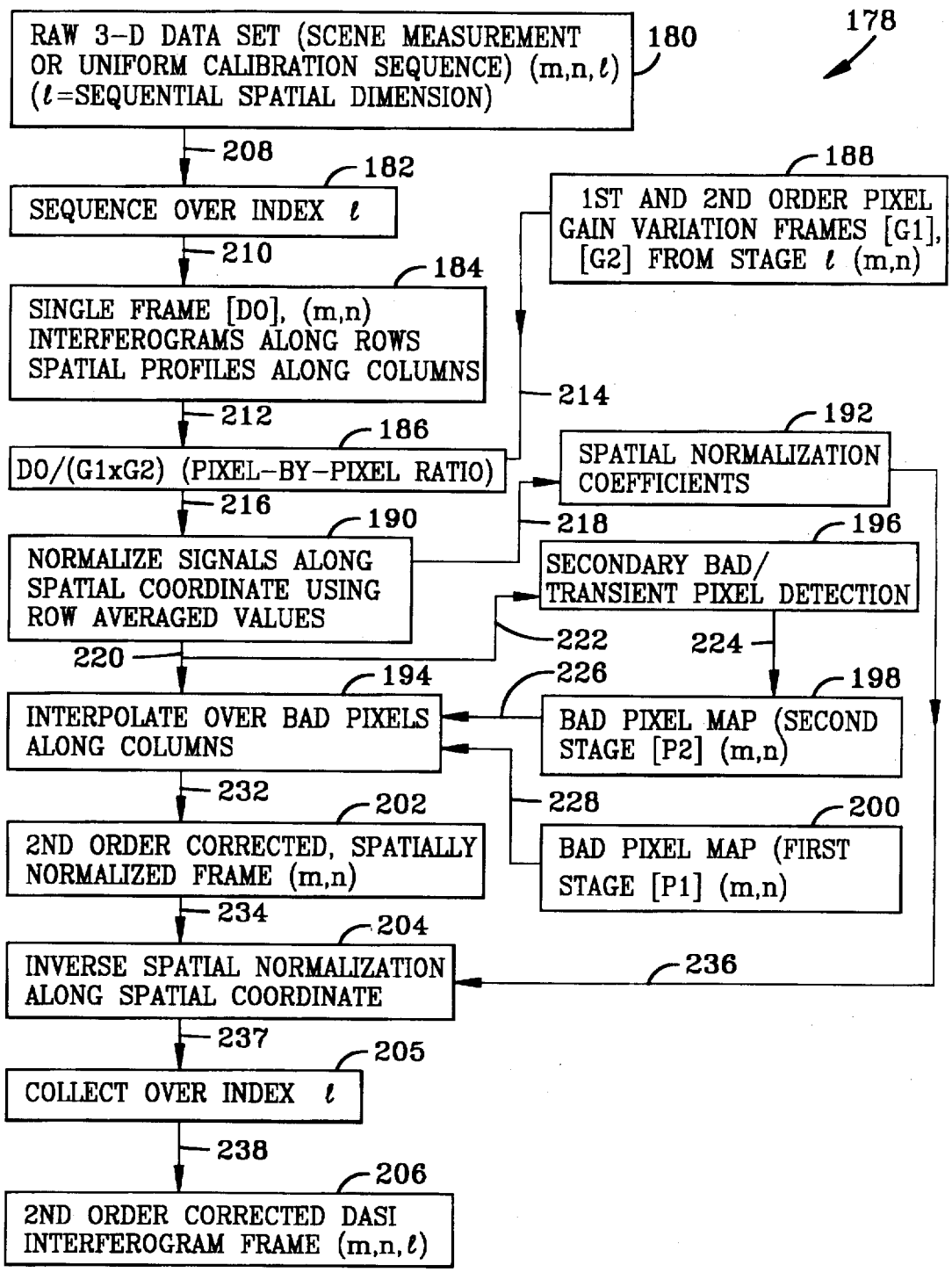

Segment 180 of FIG. 4(B) is similar to segment 94 of FIG. 4(A) and routes the raw three-dimensional (3-D) data set to segment 182, via signal path 208. Segment 180 represents the data set for which calibration is desired.

Segment 182 is similar to segment 96 of FIG. 4(A) except that it does not average (m,n) frames over index 1 on a pixel-by-pixel basis, but rather it performs sequential selection of the raw data set frames of segment 180 over index 1. Segment 182 places its output, frame by frame, on signal path 210 that serves as data state 184 (quantity DO) which is similar to data state 98 (quantity DO) of FIG. 4(A). Data state 184 is routed to segment 186 via signal path 212. The input frame, DO, of data state 184 is an individual raw data frame (one of a sequence of frames comprising a data set) which receives interpixel gain variation treatment carried out frame by frame by segment 186 using the preestablished frames G1 and G2 of data state 188 to be described.

Segment 186 also receives, on signal path 214, the contents of data state 188 which comprises first (derived by segment 104 of FIG. 4(A)) and second (derived by segment 134 of FIG. 4(A)) order pixel gain variation frames, G1, and G2. Segment 186, in a manner similar to segment 100 of FIG. 4(A), performs a division (DO/(G1×G2)) of these quantities (DO, G1 and G2) and routes the results thereof to segment 190, via signal path 216.

Segment 190 operates, in a manner similar to segment 106 of FIG. 4(A) and, among other things, derives an output on signal path 218 which serves as data state 192 comprising spatial normalization coefficients in a manner similar to segment 108 of FIG. 4(A). Segment 190, in a manner similar to segment 106 is a preprocess for the determination of bad pixels. Segment 190 delivers its developed normalized signals to segment 194 via signal path 220, and also to segment 196 via signal path 222.

Segment 196 operates in a similar manner as segment 110 of FIG. 4(A), but in addition thereto, because the raw-set data set of segment 180 does not receive frame averaging due to operation of segment 182, segment 196 also detects pixels that manifest transient problems. Segment 196 delivers its detected bad/transient pixel information to segment 198 via signal path 224.

Segment 198 is a data state similar to that of segment 114 of FIG. 4(A) which represents a bad pixel map (second stage) [P2] (m,n) which is placed on signal path 226 which is routed to segment 194. Segment 194 further receives, via signal path 228, the output of segment 200, which is actually that of data state 114 of FIG. 4(A) comprising bad pixel map [P1] (m,n).

Segment 194 operates in a similar manner as segment 112 of FIG. 4(A) and delivers, on signal path 232, its pixel information that has been interpolated over its bad quantities along columns and which serves as data state 202 comprising 2nd order corrected, spatially normalized frame (m,n) that is delivered to segment 204 via signal path 234. Segment 204 also receives data state 192 (spatial normalized coefficients), via signal path 236.

Segment 204 performs an inverse spatial normalization along spatial coordinates relative to the normalized quantities of segment 190. Segment 204 places the results of its inverse transform on signal path 237 and is collected for each value of index 1 by the operation of segment 205. In summary, the sequence of segments 184 through 204 is performed for each value of index 1, by means of segments 182 and 205. The resulting data state is collected in segment 206 via signal path 238. Data state 206 comprises the 2nd order corrected DASI interferogram data set (m,n,l). The data state of segment 206 has, as a result of the operation of segment 204, the original spatial variation information as the data state of segment 180. The data of data state 206 is substantially free of the degrading effects of the systematic errors that have plagued prior art digital array scanned interferometers (DASIs).

Together, the operations of segments 182 through 205 are executed for all of the frames of the raw data comprising the illumination patterns of the detector array 14 to be treated so as to treat the interpixel gain variation, the spurious noise and the data related to the unresponsive or otherwise defective pixels of the detector array 14. All of the treated data of segment 206 comprise the image data detected by the detector array 14 of the digital array scanned interferometer 10.

It should now be appreciated that the practice of the present invention provides for a method of operation of FIGS. 4(A) and 4(B), as well as data analysis thereof, that removes errors contributed by systematic faults such as improperly operating pixels and spurious noise that would otherwise plague the operation of the detector array 14.

In the practice of the methods of the present invention it has been observed for some types of detector arrays that favorable results are most likely to occur if the operation of the digital array scanned interferometer is initiated with input raw data representative of a bias measurement or a dark exposure so that the zero-signal pixel offset quantity of the detector array 14 can be most accurately determined. This offset quantity may then be used to treat the offset variation of each frame prior to treating the interpixel gain variation for both stages 1 and 2 of the methods of operation of FIGS. 3 and 4. Further, it has been also observed that if the input raw data DO for stage 1 is of a coadded interferogram frame that has fringe pattern variations that are small between rows of the detector array 14 (i.e., minimal spectral variability over the spatial coordinate defined by the columns of the detector array 14), then the most favorable results are also obtained. Furthermore, it has been observed that bad pixel density which is low around the interferogram frame center burst, more particularly, around the central region of the interferogram frames about the zero path difference position (ZPD), in reference to FIG. 2(B); produces favorable results. A uniform illuminated homogeneous target, serving as input raw data DO for stage 1, yields the most favorable calibration results of the methods and data analyses of the present invention. Furthermore, the methods in FIGS. 3 and 4 operate best on systematic and spurious variations that occur over the detector array 14 which are proportional to the incident intensities. Moreover, intensity variations over the spatial coordinate of the detector array 14 do not seem to have adverse effects, except when regions with very low signal levels are present. Such low intensity regions may be excluded prior to the application of methods 24 or 92. Moreover, good results may be obtained even if there is a moderate amount of spectral variability along the spatial coordinate.

The methods of operation of the present invention may be generalized to treat non-linear gain responses of the pixels and/or uncertainties in the zero-signal pixel offsets. This may be achieved by appropriate intensity binning, known in the art, of the information within 3-dimensional data sets (image cubes) that have intensity variations along the spatial coordinate (i.e., sequences of interferogram frames also known in the art), provided a statistically sufficient number of frames is available in the data set.

In the practice of the present invention, it has been noticed that the phase coefficients of the interferograms are generally slowly varying between interferograms along the spatial coordinates. Also, the phase coefficients are generally accurately determined from just the limited path difference region contained in the interferogram center burst about the zero path difference position (ZPD). These properties, together with high signal-to-noise of the interferogram center signal, relative to large fringe path differences, enable the determination of phase coefficients over the entire array, even when some rows of the array have either no signal or comprise bad pixels within the center burst. In addition, severely degraded detectors (i.e., aged or damaged spacecrafts and sensors), may be treated with the practice of the present invention by the initial application of consolidated good rows, followed by iterative treatment of rows with many bad pixels. Interpolation schemes, analogous to that described with reference to methods of FIGS. 3 and 4, may be used to partially salvage missing information from the damaged detector array.

Moreover, the methods of the present invention may be used retroactively on data that have been previously obtained and accurate measurements thereof are achieved.

Although the present invention has been described for the use of digital array scanned interferometer (DASI) 10, it should be recognized that the principles of the present invention can be applied to other types of interferometers, one classic type including a Michelson interferometer. The Michelson interferometer produces circular fringes about the intersection of its optic axis with its detector plane. For such an arrangement, a different set of coordinates (i.e., polar coordinates), other than those of FIG. 2 would be employed. The polar coordinates may utilize a different mathematical basis function set than the sine/cosine functions particularly suitable for the methods of the present invention described with reference to FIG. 4. The fundamental result would be the same, that is, the fringe signal that degrades the performance of the associated detector array would be localized in the basis function coefficient space (analogous to the Fourier domain) so that the systematic noise may be separated to determine the pixel gain variation frame G2.

Figure 5:
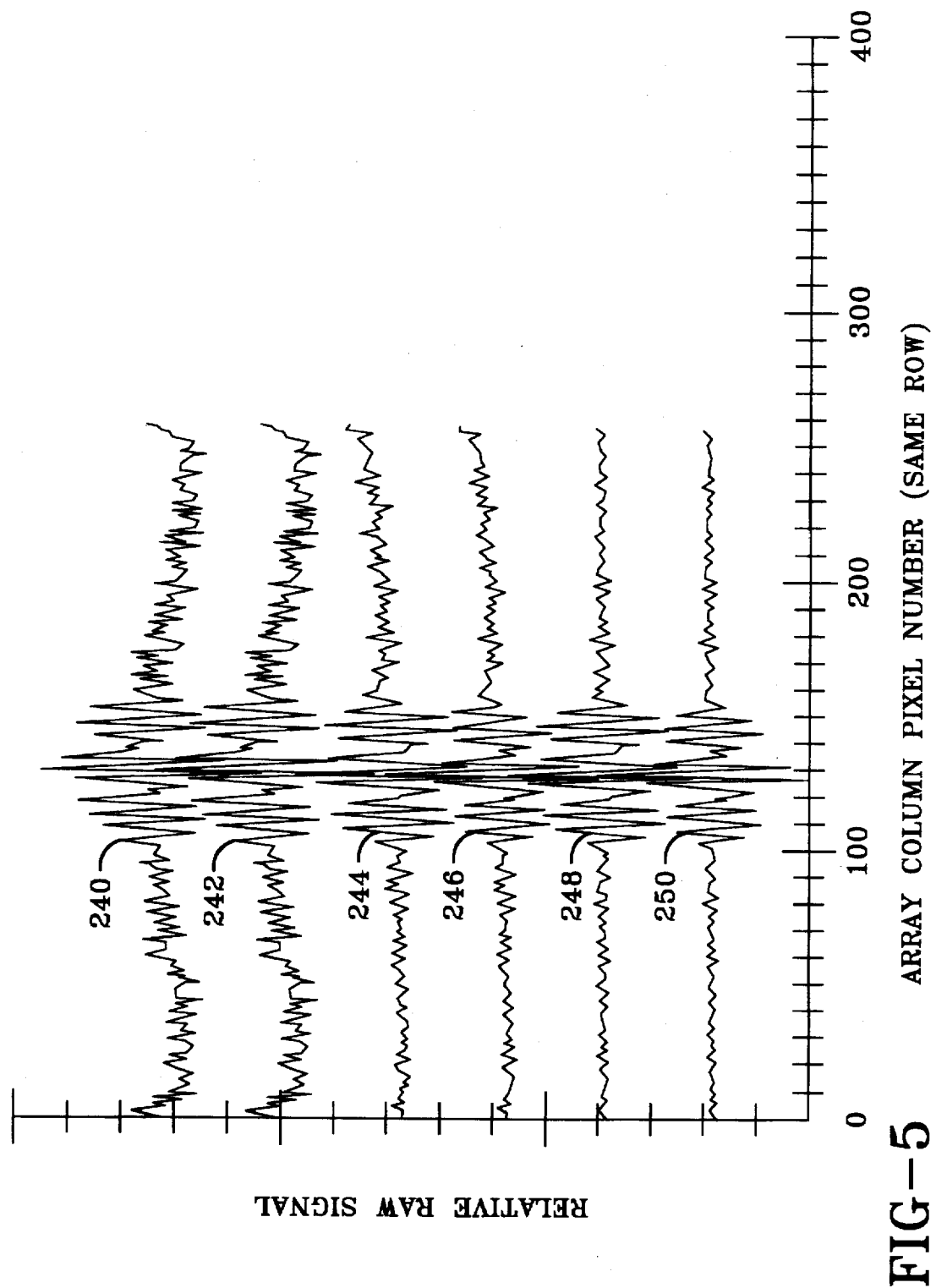
FIG. 5 illustrates the results of the various stages of processing a particular interferogram frame set of the detector array.
Figure 6:
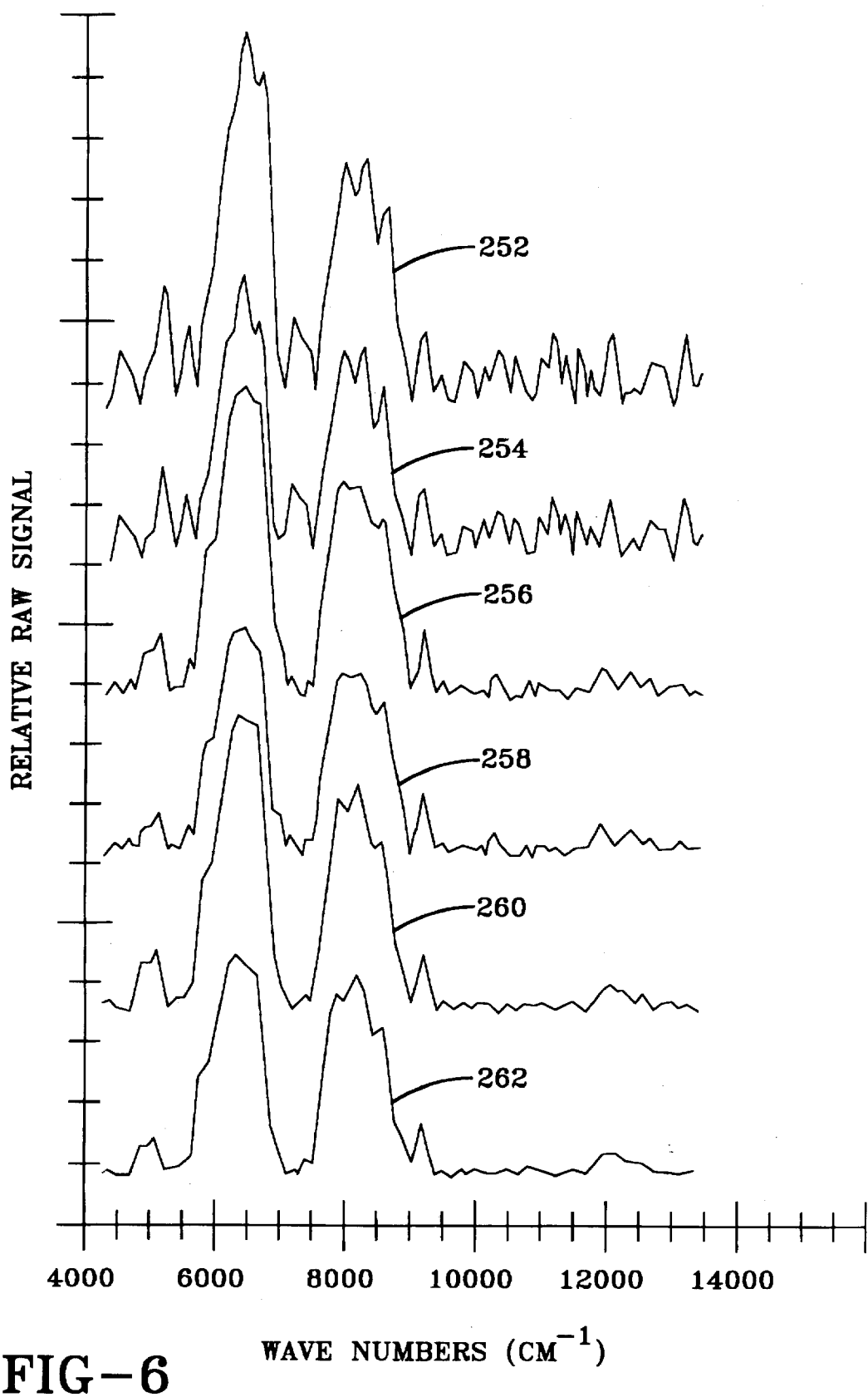
FIG. 6 illustrates the spectra corresponding to the interferogram plots of FIG. 5.

In the practice of the present invention results were obtained at various stages of processing for a particular interferometer row of the detector array, that is, an interferogram frame and such results are given in FIGS. 5 and 6, wherein both FIGS. 5 and 6 have a Y axis indicative of the relative raw signal. FIGS. 5 and 6 illustrate examples of signals from data frames at various stages of processing, such as that which occurs in the methods illustrated in FIGS. 3 and 4. For the purposes of FIGS. 5 and 6, it is assumed that the interferograms are along rows and the spatial coordinate is along columns of the data frames. FIGS. 5 and 6 show the results at various stages of processing for a particular interferogram row of the detector array 14 (see FIG. 2(B)). Still further, some of the values illustrated in FIGS. 5 and 6 are the results of averaging the pixels quantities over the index 1 (see FIG. 2(B)) in a manner as described for FIGS. 3 and 4.

FIG. 5 has an X axis indicating the array column pixel number (same row) and FIG. 6 has an X axis indicating the wavenumber (cm$^{-1}$). FIG. 5 illustrates a plurality of graphs 240, 242, 244, 246, 248, 250, whereas FIG. 6 illustrates a plurality of curves 252, 254, 256, 258, 260 and 262. The parameters of the graphs 240–250 are listed in Table 7 and the parameters of graphs 252–262 are listed in Table 8.

TABLE 7

| CURVE NO. | PARAMETER |
| --- | --- |
| 240 | Raw Interferogram. |
| 242 | Raw Interferogram (100 frames coadded over index l). |
| 244 | First order flattened. |
| 246 | First order flattened (100 frames coadded over index l). |
| 248 | Second order flattened. |
| 250 | Second order flattened (100 frames coadded over index l). |

TABLE 8

| CURVE NO. | PARAMETER |
| --- | --- |
| 252 | Spectra derived from Raw Interferogram. |
| 254 | Spectra derived from Raw interferogram (100 frames coadded over index l). |
| 256 | First order flattened. |
| 258 | First order flattened (100 frames coadded over index l). |
| 260 | Second order flattened. |
| 262 | Second order flattened (100 frames coadded over index l). |

The raw interferogram nomenclature of Tables 7 and 8 is meant to represent the results yielded by measuring a single frame of input raw data without the benefits of the present invention. The raw interferogram (100 frames coadded) of Tables 7 and 8 is meant to represent the results yielded by measuring input raw data comprising 100 coadded frames over the index 1, but such measurements do not have the benefits of the present invention. The terminology first order flattened is meant to represent the results yielded by measuring input raw data for which a single frame has been treated (flattened) by the present invention by providing the first order correction. The terminology first order flattened (100 frames coadded) represents the results achieved by the present invention providing a first order correction for 100 frames which are subsequently coadded over index 1. Finally, the terminology second order flattened and second order flattened (100 frames coadded) are meant to represent data treated by subjecting the raw data to the complete benefits of the present invention as manifested by the second order corrected DASI interferogram data set of segment 206 of FIG. 4(B).

As can be seen in FIG. 5 by a comparison between graphs 240 and 242, the raw data having multiple frames coadded has no significant noise reduction, demonstrating that the systematic errors are not treatable by coaddition. Further, it can be seen that the noise quantities are sequentially reduced from graphs 240 through 250 representative that the operation of the present invention not only reduces errors from non-operative pixels but also systematic noise data. The structure evident in the regions away from the strong centerbursts of graphs 248 and 250 is actually desired signal content in the interferograms. The noise reduction is not evident by inspection of these graphs, but it is in the corresponding transformed spectra 260 and 262 of FIG. 6. A similar comparison of coadded data as well as the corresponding reduction of systematic errors for the spectra derived from the interferograms of FIG. 5 can be seen by a review of FIG. 6. Further, a comparison of the pair of graphs 256 and 258 with the pair 260 and 262 reveals that the second order corrected data of graph 262 has benefitted from coaddition over index 1, as a result of the operation of the present invention, whereas coaddition over 1 for the first order corrected data represented by graph 258 yields minimal benefits because of the residual systematic noise. The comparison of graphs 256 and 258 serves to demonstrate the shortcomings of prior art methods, such as that described for only first order correction.

It should now be appreciated that the practice of the present invention provides for various methods of operating an imaging interferometer and data analysis thereof that not only reduces the effects normally contributed to by non-operational pixels, more particularly, non-operative CCD semiconductor device serving as pixels, but also reduces the spurious and systematic noise that would otherwise degrade the image being measured by the interferometer.

Further, although the invention has been described relative to specific embodiments thereof, it is not so limited and many modifications and variations thereof will now become readily apparent to those skilled in the art in light of the above teachings.

What I claim is:

1. A method of operating an interferometer having means to process light from a light source to produce an interferogram corresponding to an image of a target, having a range of fringe path differences, onto a focal plane and having means to image a field of view of said interferometer on a frame set basis onto a detector having pixels which provide signals to form a first illumination pattern also corresponding to said image of said target and having unwanted components and comprising an interferogram frame set having m, n and 1 dimensions serving as coordinates of the interferogram frame sets, said method removing unwanted components of said first illumination pattern and comprising the steps of:

(a) accepting an interferogram frame set containing pixel information;

(b) averaging the pixel information of said interferogram over the l dimension thereof to yield a single, coadded interferogram frame having only m and n dimensions;

(c) normalizing said coadded interferogram frame to reduce signal variations along spatial coordinates thereof;

(d) detecting bad pixel information of said normalized coadded interferogram frame;

(e) interpolating for first bad pixel information so as to remove said bad pixel information from said coadded interferogram frame;

(f) applying phase alignment correction to the interpolated, coadded interferogram frame so as to remove said unwanted components from said first illumination pattern;

(g) filtering said phase alignment corrected interferogram frame to develop a systematic noise frame;

(h) applying an inverse phase alignment correction to said systematic noise frame to develop a second order calibration frame;

(i) re-accepting one of same and similar interferogram frame sets;

(j) applying at least said second calibration frame to said re-accepted interferogram frame set of step (i) to correct for inter-pixel gain variation systematic errors so as to remove said inter-pixel gain variation systematic errors from said re-accepted interferogram frame set;

(k) normalizing said inter-pixel gain variation corrected interferograms;

(l) interpolating for second bad pixel information so as to remove said bad pixel information from said normalized inter-pixel gain variation corrected interferograms;

(m) applying inverse normalization to said interpolated, inter-pixel gain variation corrected interferograms to form second order corrected interferogram frame; and (n) collecting the results of steps (j) through (m) repeated over the index 1 to yield second order corrected interferogram data frame set having m,n,l dimensions and serving as a second illumination pattern corresponding to said image of said target but being transformed from said first illumination pattern so that said image of said target has said unwanted components removed therefrom as well as being free of said first and second bad pixel information and said inter-pixel gain variation systematic errors.

2. The method of operating an interferometer according to claim 1 further comprising the steps of:

(a) applying a calibration reference measurement to the averaged pixel information of step (b) of claim 1 before the averaged pixel information is normalized in step (c) of claim 1; and (b) applying said calibration reference measurement to said re-accepted first interferogram along with said second calibration frame in step (j) of claim 1 for said correction of said inter-pixel gain variations systematic errors.

3. A method of operating an interferometer having means to process light from a light source to produce an interferogram corresponding to an image of a target, having a range of fringe path differences, onto a focal plane and having means to image a field of view of said interferometer on a frame set basis as an interferogram frame of a detector to form a first illumination pattern also corresponding to said image of said target and having unwanted components, said detector comprising pixels arranged into a m, n, l matrix defining the coordinates of said interferogram frame, each of said interferogram frames serving as raw data of said illumination pattern represented by signals associated with said pixels, said method removing unwanted components of said first illumination pattern and comprising the steps of:

(a) accepting an interferogram frame set containing pixel information;

(b) averaging the pixel information of said interferogram over the l dimension thereof to yield an interferogram frame having only m and n dimensions;

(c) normalizing said averaged interferogram frame;

(d) detecting first bad pixel information of said normalized interferogram frame;

(e) interpolating for the bad pixel information so as to remove said first bad pixel information from said normalized interferogram;

(f) performing phase alignment correction on said interpolated and normalized interferogram and deriving row-wise phase coefficients and a data frame in which the interferogram frames are symmetric about a zero phase difference (ZPD) quantity and are aligned along all of said n dimension so as remove said unwanted components of said first illumination pattern;

(g) storing said row-wise phase coefficients;

(h) performing a two-dimensional transform on the data frame in which the interferogram frame is symmetric about said zero phase difference so that said data frame is transformed from being a real signal into its elementary complex components;

(i) filtering said transformed data frame to separate systematic noise therefrom;

(j) performing an inverse composite two-dimensional (2D) transform on said systematic noise;

(k) combining said stored row-wise phase coefficients with said inverse two-dimensional transformed systematic noise to derive a second order pixel gain variation frame G2;

(l) re-accepting said interferogram frame set containing pixel information;

(m) sequentially selecting said accepted interferogram frame of step (1) over the l dimension thereof;

(n) normalizing said sequentially selected interferogram frame;

(o) detecting second bad pixel information of said normalized and sequentially selected interferogram frame;

(p) interpolating for the second bad pixel information so as to remove said second bad pixel information from said normalized and sequentially selected interferogram frame;

(q) performing inverse normalization of the normalized data of step (p) to form a second order corrected frame D2;

(r) accepting a second interferogram frame by step (m) and repeating steps (n)–(q); and (s) continuing step (r) for all of the frames of the raw data comprising said image and collecting the resulting corrected interferogram frame set having m,n,l dimensions and serving as a second illumination pattern corresponding to said image of said target but being transformed from said first illumination pattern so that said target has said unwanted components removed therefrom as well as being free of said first and second bad pixel information.

4. The method of operating an interferometer according to claim 3 further comprising the steps of:

(a) dividing a calibration reference measurement into the averaged pixel information of step (b) of claim 3 before the average pixel information is normalized in step (c) of claim 3; and (b) dividing the summation of a calibration reference measurement and said second order pixel gain variation frame G2 into said sequence checked interferogram frame of said step (m) of claim 3 before said sequence checked interferogram frame is normalized in said step (n) of claim 3.

* * * * *